(12) United States Patent
Onuma et al.

(10) Patent No.: US 11,730,281 B2
(45) Date of Patent: Aug. 22, 2023

(54) VEHICLE SEAT

(71) Applicant: TS TECH CO., LTD., Asaka (JP)

(72) Inventors: Koji Onuma, Tochigi (JP); Soichiro Kamei, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 20 days.

(21) Appl. No.: 17/427,144

(22) PCT Filed: Jan. 30, 2020

(86) PCT No.: PCT/JP2020/003405
§ 371 (c)(1),
(2) Date: Jul. 30, 2021

(87) PCT Pub. No.: WO2020/158855
PCT Pub. Date: Aug. 6, 2020

(65) Prior Publication Data
US 2022/0095809 A1 Mar. 31, 2022

(30) Foreign Application Priority Data

Feb. 1, 2019 (JP) .................................. 2019-017502
Feb. 1, 2019 (JP) .................................. 2019-017506
Feb. 1, 2019 (JP) .................................. 2019-017508

(51) Int. Cl.
*B60N 2/58* (2006.01)
*B60N 2/70* (2006.01)
(Continued)

(52) U.S. Cl.
CPC ................ *A47C 31/02* (2013.01); *B60N 2/58* (2013.01); *B60N 2/5825* (2013.01); *B60N 2/68* (2013.01);
(Continued)

(58) Field of Classification Search
CPC .. B60N 2/5825; B60N 2/7041; B60N 2/7094; B60N 2/7058
See application file for complete search history.

(56) References Cited

U.S. PATENT DOCUMENTS 11,084,405 B2 * 8/2021 Onuma .................. B60N 2/686
11,312,273 B1 * 4/2022 Bonk .................... B60N 2/5685
(Continued)

FOREIGN PATENT DOCUMENTS

DE 202007000484 U1 * 6/2008 ........... B60N 2/0284
FR 3068654 A1 * 1/2019
(Continued)

OTHER PUBLICATIONS

International Search Report.
(Continued)

*Primary Examiner* — Timothy J Brindley
(74) *Attorney, Agent, or Firm* — Dority & Manning, PA

(57) ABSTRACT

Provided is a vehicle seat that allows engagement holes for engaging an end part of the skin member to be provided without burdening the seat frame design. The seat cushion of the vehicle seat includes a frame structure, a support member supported by the frame structure within the frame structure to resiliently support an occupant, a pad provided on a proximal side of the frame structure and the support member, and a skin member covering the pad. The support member is provided with plurality of engagement portions engaging end parts of the skin member.

6 Claims, 11 Drawing Sheets

(51) Int. Cl.
*A47C 31/02* (2006.01)
*B60N 2/68* (2006.01)
*B68G 7/05* (2006.01)

(52) U.S. Cl.
CPC ............ *B60N 2/70* (2013.01); *B60N 2/7041* (2013.01); *B68G 7/05* (2013.01)

(56) References Cited

U.S. PATENT DOCUMENTS

2018/0272909 A1* 9/2018 Misono .................... B60N 2/70
2018/0272969 A1* 9/2018 Onuma ................ B60N 2/5635

FOREIGN PATENT DOCUMENTS

| | | | | |
|---|---|---|---|---|
| JP | 2015003576 A | * | 1/2015 | |
| JP | 2015-030392 | | 2/2015 | |
| JP | 2017-201999 | | 11/2017 | |
| JP | 6309130 | | 4/2018 | |
| JP | 2022147823 A | * | 10/2022 | |
| WO | WO-2012150633 A1 | * | 11/2012 | ........... B60N 2/5825 |
| WO | WO-2014024586 A1 | * | 2/2014 | ........... B60N 2/4228 |
| WO | WO 2018-173410 | | 9/2018 | |
| WO | WO-2019208555 A1 | * | 10/2019 | ............. B60N 2/502 |

OTHER PUBLICATIONS

PCT International Search Report (with English translation) for corresponding PCT Application No. PCT/JP2020/003405, dated Mar. 31, 2020, 5 pages.

* cited by examiner

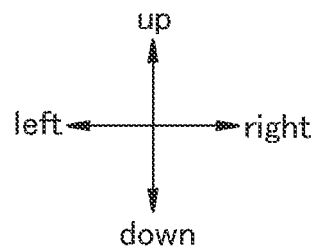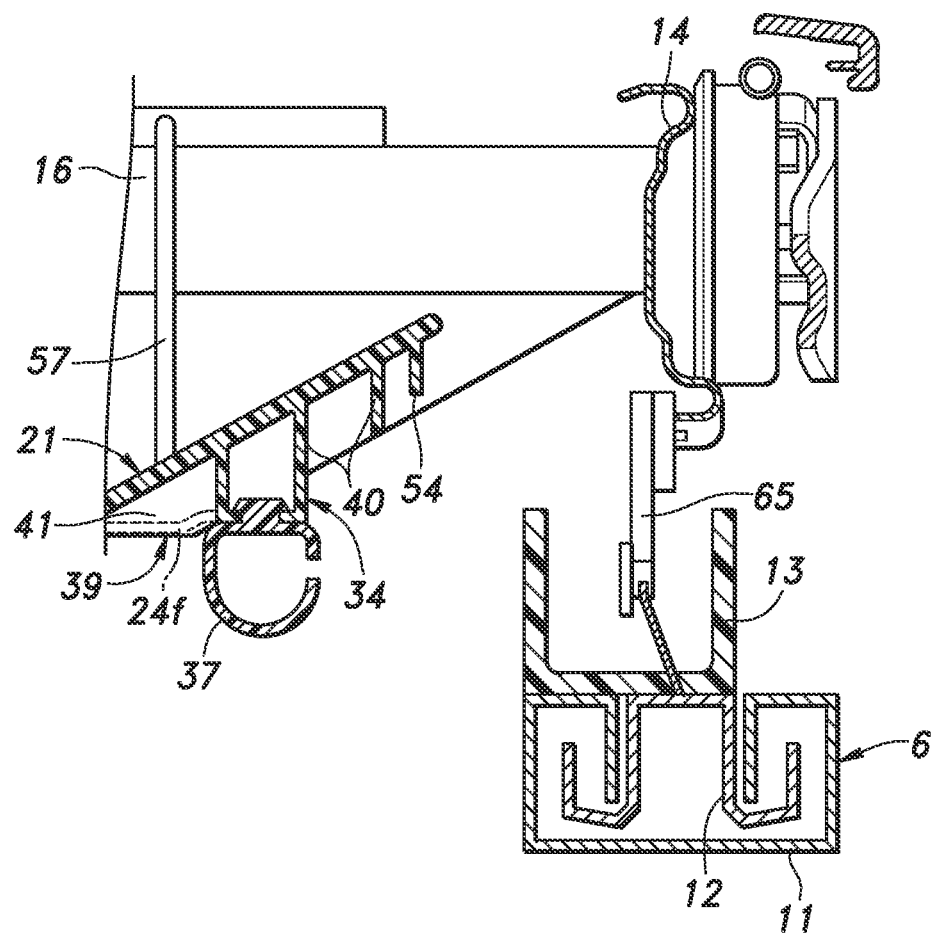
Fig.3

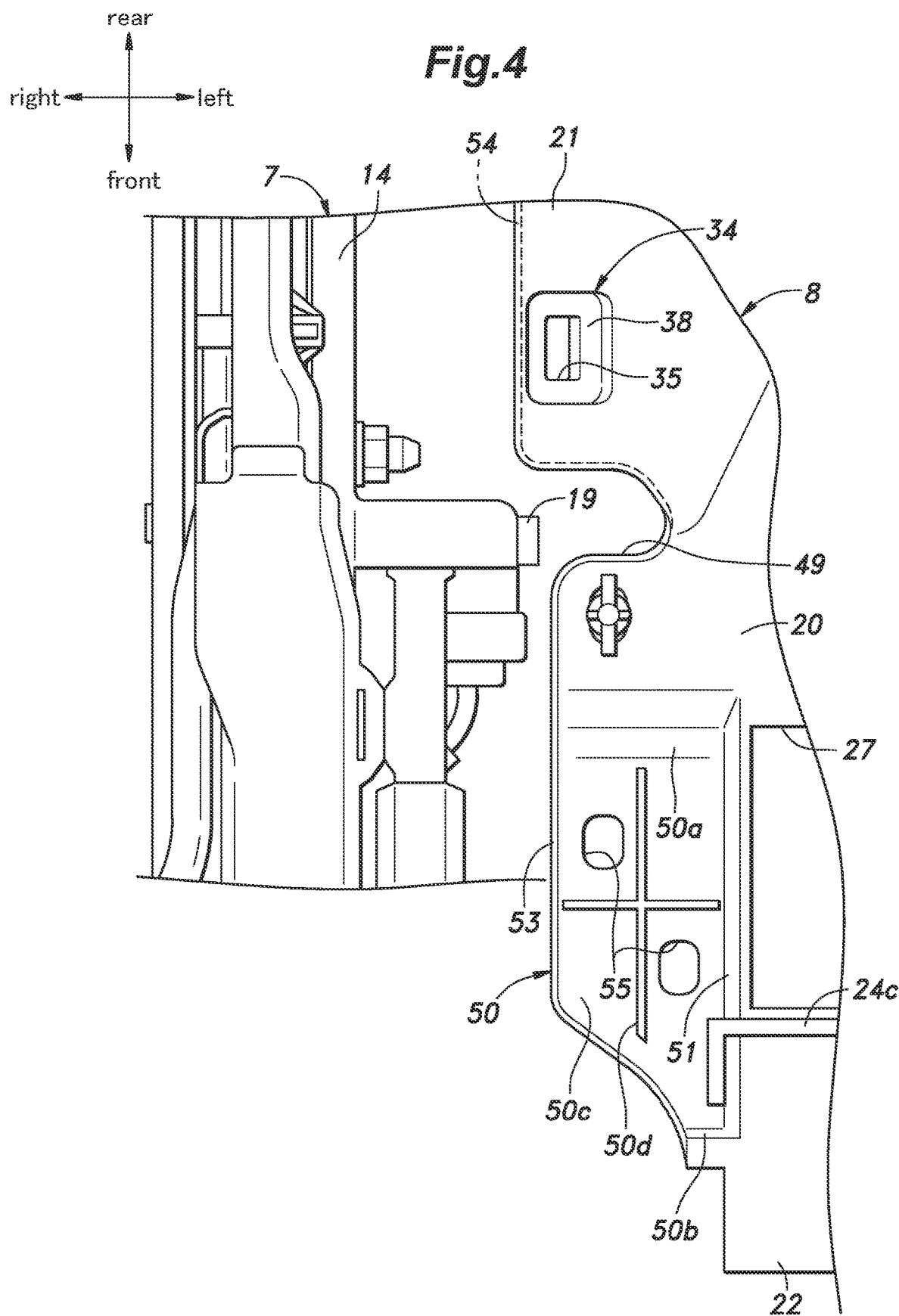

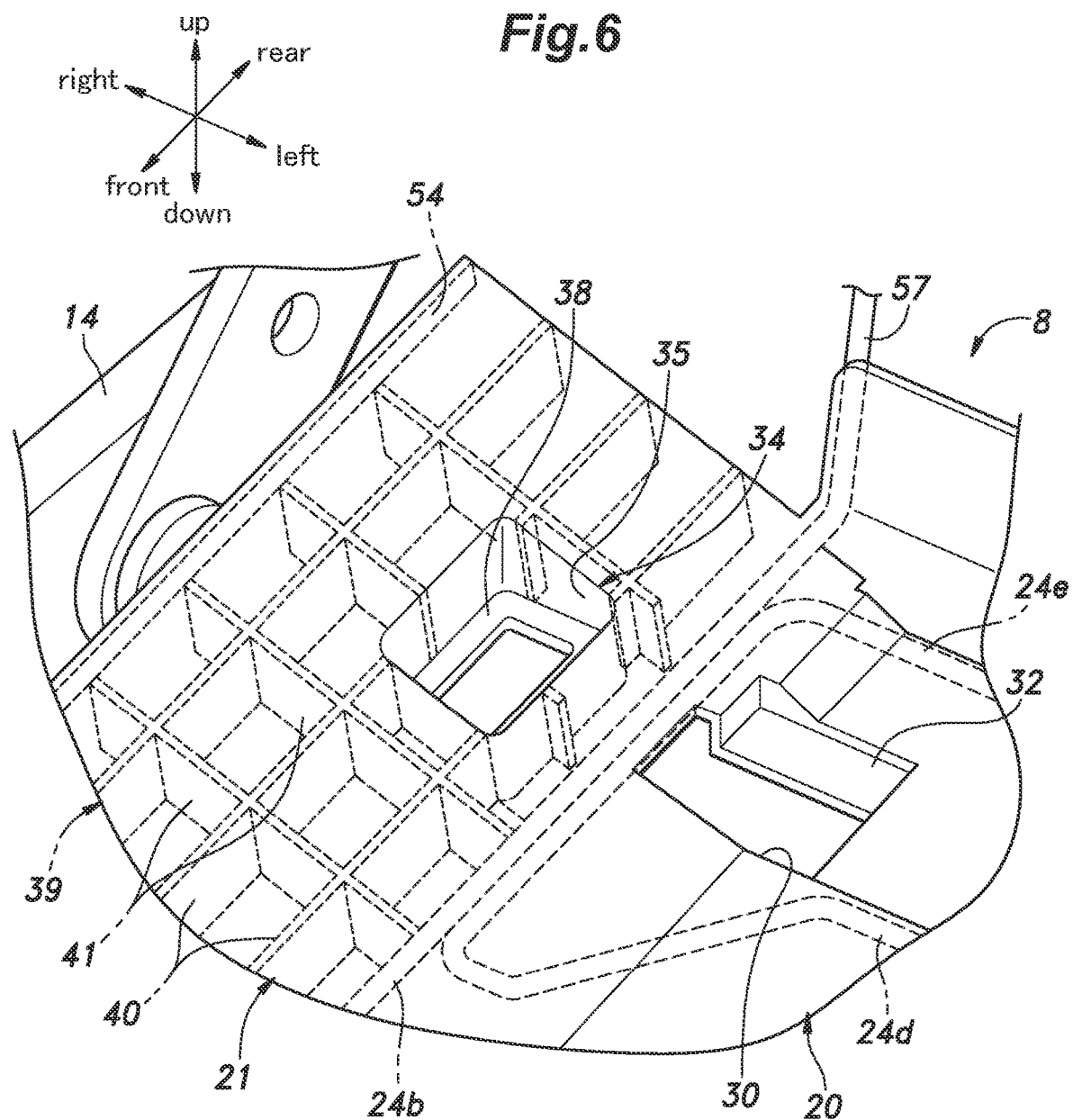

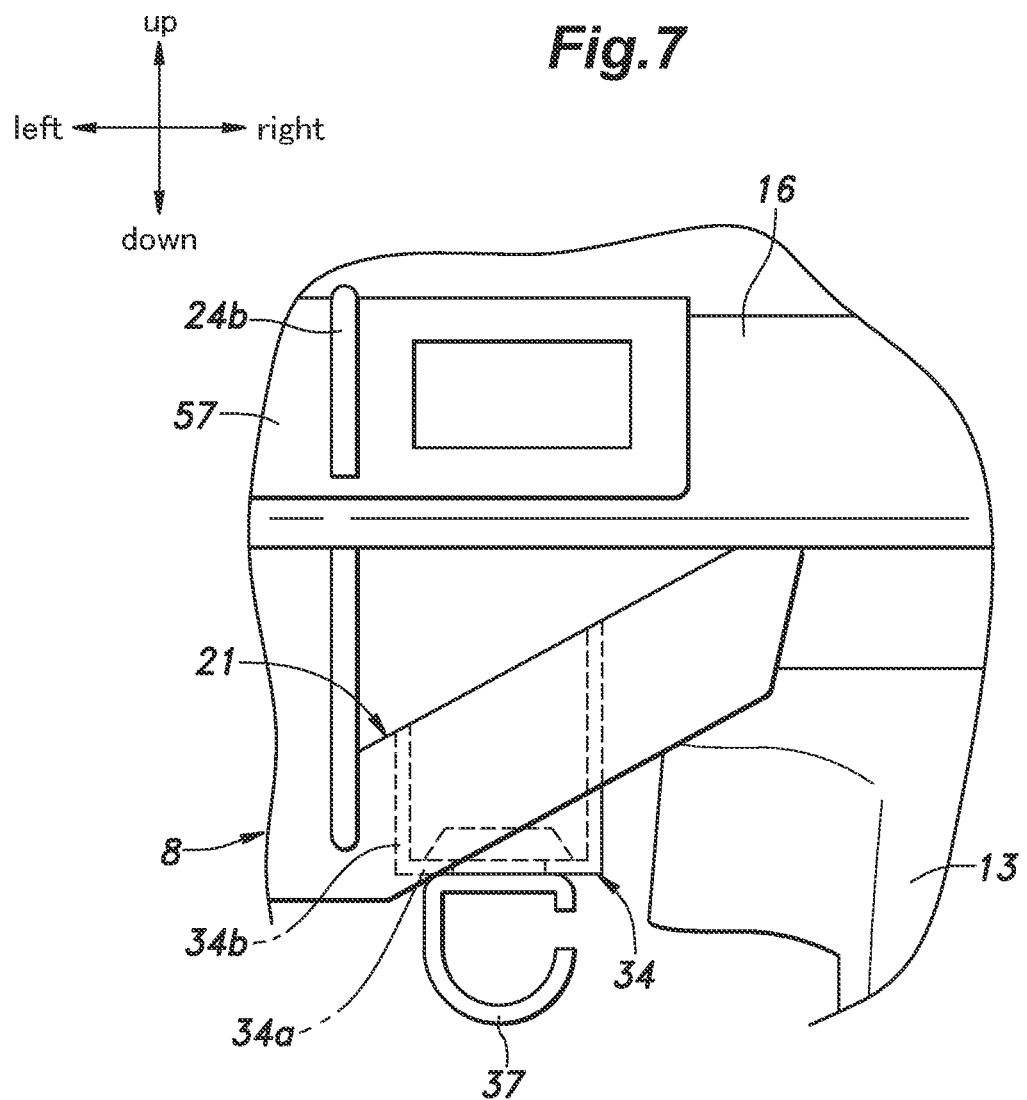

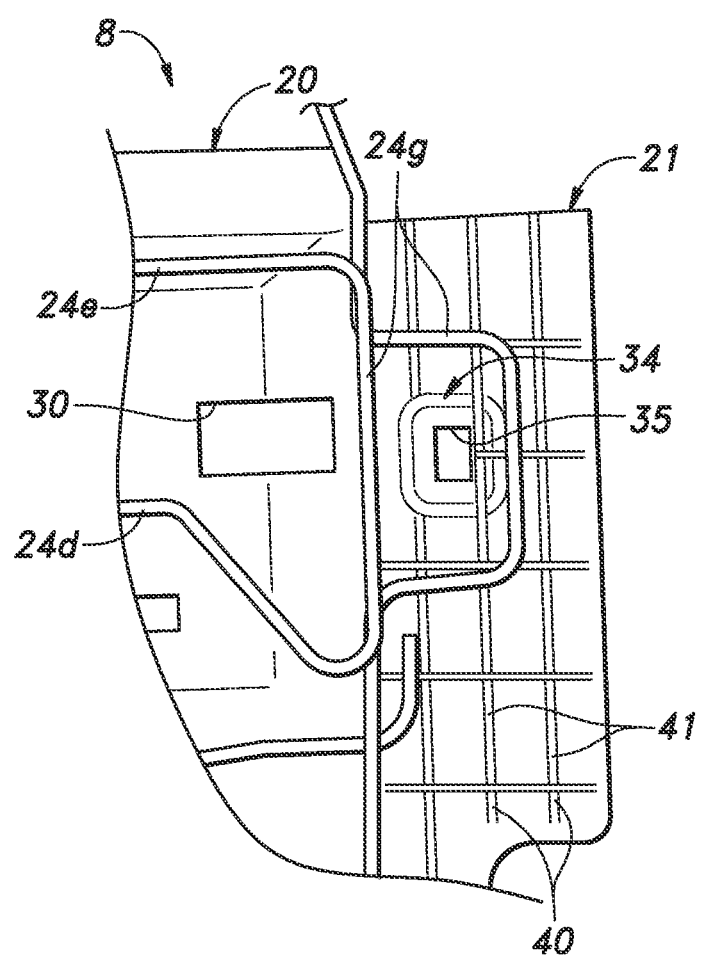

VEHICLE SEAT

CROSS REFERENCE TO RELATED APPLICATIONS

This application is the U.S. National Stage entry of International Application No. PCT/JP2020/003405 filed under the Patent Cooperation Treaty and having a filing date of Jan. 30, 2020, which claims priority to Japanese Patent Application No. 2019-017502 having a filing date of Feb. 1, 2019, Japanese Patent Application No. 2019-017506 having a filing date of Feb. 1, 2021, and Japanese Patent Application No. 2019-017508 having a filing date of Feb. 1, 2019, all of which are incorporated herein by reference.

TECHNICAL FIELD

The present invention relates to a vehicle seat.

BACKGROUND OF THE INVENTION

In a known vehicle seat, hooks are sewn to the edge of the skin member forming a seat cushion, and are hooked onto the edges of the corresponding engagement holes (notches) formed in the seat frame to fixedly secure the skin member to the seat frame. See Patent Document 1, for instance. The engagement holes are formed in the cover member that covers the rear cross member connecting the rear ends of the left and right side members to each other.

In another known vehicle seat, a support member formed as a plastic plate member for supporting an occupant is provided inside the seat cushion frame. See Patent Document 2, for instance. The support member has a pair of inclined portions that incline upward toward the left and right side edges of a rear part of the main body of the support member, respectively. The inclined portions support the occupant's buttocks obliquely from the lateral directions so that the support force supporting the occupant's buttocks is spread over a wide area.

PRIOR ART DOCUMENT(S)

Patent Document(s)

Patent Document 1: JP2015-030392A
Patent Document 2: JP6309130B1

SUMMARY OF THE INVENTION

Task to be Accomplished by the Invention

In order to provide the engagement holes in the seat frame, it is necessary to attach a plate member or projecting pieces to form the engagement holes therein. Such projecting pieces may not be attached to desired parts of the seat frame because of possible interferences with other members so that the freedom in the positioning of the engagement holes may be impaired. Also, there is a problem that the projecting pieces when provided on the seat frame add to weight of the seat frame.

In view of such problems of the prior art, a primary object of the present invention is to provide a vehicle seat that allows engagement holes for engaging an end part of the skin member to be provided without burdening the seat frame design.

Means to Accomplish the Task

To achieve such an object, an embodiment of the present invention provides a vehicle seat (1) having a seat cushion (2) and a seat back (3), the vehicle seat comprising: a frame structure (7) provided in at least one of the seat cushion and the seat back; a support member (8) supported by the frame structure within the frame structure to support an occupant; a pad provided on a proximal side of the frame structure and the support member; and a skin member covering the pad, the support member including a plurality of engagement portions (29, 30) engaging an end part of the skin member.

Thereby, the end part of the skin member can be engaged to the support member. Therefore, it is not necessary to provide an engagement portion on the frame structure, and the frame structure can be reduced in size and weight.

In an embodiment of the present invention, in regard to this vehicle seat, the support member is formed in a plate shape, the engagement portions each comprise an engagement hole (29, 30) consisting of a through hole formed in the support member, the end part of the skin member being provided with a hook (28) passed through the corresponding engagement hole from a distal side thereof to a proximal side thereof to engage a peripheral edge part of the engagement hole.

Thereby, the end part of the skin member can be engaged to the support member by using a simple configuration.

In an embodiment of the present invention, in regard to this vehicle seat, an edge wall projects from the proximal side of the peripheral edge part of each engagement hole to engage a free end of the corresponding hook.

Thereby, the hook can be prevented from being inadvertently dislodged from the engagement hole by a secure engagement between the edge wall and the hook.

In an embodiment of the present invention, in regard to this vehicle seat, the support member is provided with an inclined portion (21) that is inclined toward the proximal side as one moves laterally outward.

Since the engagement hole is provided in the main body of the support member, instead of the inclined portion that is more prone to deformation under external forces, deformation of the engagement hole can be minimized, and inadvertent dislodgment of the hook from the engagement hole can be avoided. Further, since the engagement hole is laterally aligned with the inclined portion, the support member can be reduced in size.

In an embodiment of the present invention, the vehicle seat further comprises a clip (37) for fixing another member to the inclined portion, wherein a mounting hole (35) for inserting the clip being formed in a part of the inclined portion located on a lateral extension line of the engagement hole along the supporting member, and a rib (40, 41) is provided on a part of the support member surrounding the mounting hole.

Since the engagement hole is laterally aligned with the mounting hole reinforced by the rib, the rigidity of the engagement hole is also improved.

In an embodiment of the present invention, in regard to this vehicle seat, the support member is formed by a resin having a metal wire (24) insert molded therein, and at least a part of the wire extends in a longitudinal direction.

Thus, the rigidity reduced by providing the engagement hole is compensated by the wire.

In an embodiment of the present invention, in regard to this vehicle seat, the wire includes a central longitudinal wire (24a) that extends across the engagement hole in the longitudinal direction, and the hook is provided with a slot that receives the central longitudinal wire.

Thus, the rigidity of the support member around the engagement hole can be increased by providing the wire in the engagement hole. The hook can be hooked on the edge of the engagement hole by receiving the wire in the slot.

In an embodiment of the present invention, in regard to this vehicle seat, the wire includes a side longitudinal wire (24b) that extends in the longitudinal direction laterally outside of the engagement hole.

This arrangement contributes to the size reduction of the support member.

In an embodiment of the present invention, in regard to this vehicle seat, the engagement hole is laterally elongated, and the wire includes a central lateral wire (24d) extending laterally adjacent to the engagement hole.

Owing to the central wire extending along the extending direction of the engagement hole, the reinforcement by the wire is enhanced.

In an embodiment of the present invention, in regard to this vehicle seat, the engagement portion is displaced from a position at which the skin member is pulled down at a rear part of the seat cushion.

By displacing the pull-down position from the engagement portion of the skin member, assembly work efficiency is improved.

Further, in the plate-shaped support member having the inclined portion, the weight of the occupant is distributed between the inclined portion and the main body in the rear part of the support member where the inclined portion is provided, but the weight of the occupant is not so well distributed in the front part of the support member where the inclined portion is not provided. When an occupant gets into the vehicle or cleans the inside of the vehicle, the weight of the occupant may be temporarily concentrated on the front part of the seat. Therefore, it has been desired to improve the rigidity of the front part of the support member. An embodiment of the present invention aims to improve the rigidity of a front part of a support member in a vehicle seat having a plate-shaped support member including an inclined portion.

To achieve such an object, an embodiment of the present invention provides a vehicle seat (1) having a seat cushion (2) and a seat back (3), the vehicle seat comprising: a frame structure (7) provided in the seat cushion and including a left and a right side member (14), and a pair of cross members connecting corresponding ends of the side members to each other; a support member (8) for supporting an occupant, the support member including a plate-like main body (20) supported by the frame structure within the frame structure and extending substantially in parallel with the frame structure, a pair of inclined portions (21) extending laterally outward from parts of lateral side edges of the main body with an upward inclination, a front mounting portion (22) extending from a front edge of the main body to be engaged by the front cross member, and a rear mounting portion (23) extending from a rear edge of the main body to be engaged by the rear cross member; a pad provided on an upper side of the frame structure and the support member; and a skin member covering the pad, side parts of a front part (50) of the main body where the inclined portions are absent being each provided with a crank shape (50a) differing in height between a front side and a rear side thereof in side view.

The crank shapes increase the rigidity of the front part of the support member.

In an embodiment of the present invention, in regard to this vehicle seat, the crank shapes of the front part are each formed such that the front side is lower than the rear side in side view.

Since the front side of each crank shape is lower than the rear side thereof in side view, the load on the legs of the seated occupant can be reduced.

In an embodiment of the present invention, in regard to this vehicle seat, the left and right side edges of the front part of the main body are provided with flanges (53), respectively.

The flanges increase the rigidity of the front part of the support member.

In an embodiment of the present invention, in regard to this vehicle seat, the flanges are each continuous at least over a fore and aft range in which the corresponding crank-shaped step extends.

Thus, the rigidity of the front part of the support member can be further improved by the continuous flanges.

In an embodiment of the present invention, in regard to this vehicle seat having the flanges, the flanges of the front part of the main body project to the upper side, and laterally outer side edges of the inclined portions are provided with inclined portion flanges projecting to the lower side.

Thus, when another member is attached to the lower side of the lowered portion of the crank shape, the influence of the tip of the clip protruding from the upper side is mitigated by the raised portion in the crank shape so that the impairment of the seating comfort can be avoided. Further, since the inclined portion flanges project to the lower side, the seating comfort is not impaired.

In an embodiment of the present invention, in regard to this vehicle seat having the flanges, the side edges formed with the flanges at least partly come laterally toward each other as one moves toward front parts thereof.

Since the width of the front edge of the front part is narrowed, the rigidity thereof can be increased.

In an embodiment of the present invention, in regard to this vehicle seat, the fore and aft length of the front part is shorter than the fore and aft length of the inclined portions, and the laterally outer edges of the front part are located laterally inward of the laterally outer edges of the inclined portions, Since the front part is smaller than the rear part having the inclined portions on either side, the load applied to the front part is relatively small while the load applied to the rear part is laterally distributed, so that the overall strength of the support member is increased.

In an embodiment of the present invention, in regard to this vehicle seat, each lateral side edge of the front part is provided with a recess (50c) having a rear end defined by the corresponding crank shape.

The recesses increase the rigidity of the front part.

In an embodiment of the present invention, in regard to this vehicle seat, a lateral length of the front edge of the front part smaller than a lateral length of a rear edge of the front part, and the front mounting portion is at least partly located near lateral edges of the front part.

Since the front edge of the front part is reduced in width, the mounting stability of the front mounting portion to the cross member is improved.

In an embodiment of the present invention, this vehicle seat further comprises a left and a right slide rail (6) fixed to a vehicle floor (5) and slidably supporting the frame structure in the fore and aft direction, and a position sensor (19) attached to at least one of the side members extending in the fore and aft direction to detect the position of the seat in the fore and aft direction with respect to the floor, wherein at least one of the left and right side edges of the support member is formed with a side cut-out (49) located between the corresponding inclined portion and the front part of the support member, a fore and aft position of the position sensor being within a range of the side cut-out in the fore and aft direction.

Thus, the side cut-out can reduce the size and weight of the support member, and allow the mounting state of the position sensor to be inspected with ease.

In an embodiment of the present invention, in regard to this vehicle seat, the front mounting portion comprises a plurality of front mounting pieces (56) that are separated from each other in the lateral direction, and a part of the front edge of the main body where the front mounting pieces are absent is provided with a front notch (58) having a smaller lateral width than a distance between two parts where adjacent front mounting pieces are connected to the front edge.

Owing to the front notch, the part ranging from the vicinity of the front edge of the main body to the front mounting pieces can be made substantially deformable so that the assembling of the front mounting pieces to the cross member can be facilitated.

Further, in regard to the plate-shaped support member having the inclined portions, it may be desired to attach another member to the back surface of one of the inclined portions. If a mounting hole is provided in the inclined portion for attaching a clip to secure the other member, the strength of the inclined portion decreases. Another object of the present invention is thus to provide an embodiment consisting of a vehicle seat having a plate-shaped support member having the inclined portions, wherein a mounting hole is provided in one of the inclined portions without decreasing the strength of the inclined portion.

To accomplish such an object, the present invention provides an embodiment consisting of a vehicle seat (1) having a seat cushion (2) and a seat back (3), the vehicle seat comprising: a frame structure (7) provided in at least one of the seat cushion and the seat back; a support member (8) for supporting an occupant, the support member including a plate-like main body (20) supported by the frame structure within the frame structure and extending substantially in parallel with the frame structure, a pair of inclined portions (21) extending laterally outward from at least parts of lateral side edges of the main body with an upward inclination; a pad (9) provided on a proximal side of the frame structure and the support member, a skin member (10) covering the pad; and a clip (37) for fixing another member to a back side of the inclined portion, wherein the inclined portions are each formed with a tubular portion (34) protruding toward a distal side substantially orthogonally to the main body and internally defining a mounting hole (35) for inserting the clip in a hollow interior thereof, and made of a resin having a metal wire (24) insert molded therein, the wire including a hole annular wire (24g) surrounding the mounting hole. The "hole annular wire" may consist of a single-piece wire arranged in an annular fashion, and may also consist of two or more pieces of wire jointly forming an annular shape.

Since the mounting hole is surrounded by the hole annular wire, the reduction in the strength of the inclined portion that can be otherwise caused by the provision of the mounting hole can be compensated.

In an embodiment of the present invention, in regard to this vehicle seat, a lattice-like reinforcing portion (39) consisting of ribs (40, 41) arranged in a lattice shape is provided on the distal side of the inclined portion, and the tubular portion is provided in the lattice-like reinforcing portion.

The lattice-like reinforcing portion can compensate for the decrease in the strength of the inclined portion that can be otherwise caused by providing the mounting hole.

In an embodiment of the present invention, in regard to this vehicle seat, at least a part of the ribs of the lattice-like reinforcing portion intersect the hole annular wire at a right angle.

Since the wire and the ribs reinforce the periphery of the mounting hole in different directions, the rigidity around the mounting hole is improved.

In an embodiment of the present invention, in regard to this vehicle seat having the lattice-like reinforcing portion, the tubular portion is connected to a part of the ribs.

Since the tubular portion is connected to the ribs, the decrease in the strength of the inclined portion that can be otherwise caused by providing the mounting hole can be further compensated.

In an embodiment of the present invention, in regard to this vehicle seat, the ribs includes a longitudinal rib (40) extending in a longitudinal direction and a lateral rib (41) extending in a lateral direction, and the tubular portion includes a rectangular bottom wall (34a) having a through hole and having sides aligning with the extending directions of the ribs arranged in the lattice shape in plan view, and a side wall (34b) standing upright from the sides of the bottom wall, at least a part of the longitudinal rib being connected to the tubular portion at a part located between an outer surface of the side wall extending in the longitudinal direction and an inner surface of the through hole adjacent to this side wall.

Since the lateral displacement between the side wall of the tubular portion extending in the longitudinal direction and the longitudinal rib is small, the side wall and the longitudinal wall essentially form a single wall so that the mechanical strength provided jointly by the side wall and the longitudinal rib can be increased.

In an embodiment of the present invention, in regard to this vehicle seat, at least a part of the lateral rib is connected to the tubular portion, and a lower edge of a part of the lateral rib located laterally inward of the tubular portion is located below a lower edge of the tubular portion.

Since the lower edge of the part of the lateral rib that is connected to the inside of the tubular portion is located below the lower edge of the tubular portion, the tubular portion is reinforced over the entire vertical length.

In an embodiment of the present invention, in regard to this vehicle seat having a longitudinal rib and a lateral rib, the wire includes a rib wire embedded in a part of the lateral rib connected to a laterally inner side of the tubular portion.

The rib wire increases the rigidity of the lateral rib connected to the inside of the tubular portion from the lateral direction so that the tubular portion is effectively reinforced.

In an embodiment of the present invention, in regard to this vehicle seat, the rib wire extends along a lower end of the lateral rib in which the rib wire is embedded.

Since the rib wire is arranged along the lower end of the lateral rib, the lower edge of the lateral rib is reinforced so that the tubular portion is further reinforced.

In an embodiment of the present invention, in regard to this vehicle seat, the rib wire is positioned at a same height or below the lower end of the tubular portion.

Since the rib wire is positioned in the lower portion, the part of the tubular portion where the severest loading is applied when securing the clip can be reinforced by the rib wire located at the same height.

Effect of the Invention

According to the present invention, since the support member is provided with multiple engagement portions that engage the end part of the skin member, it is not necessary to provide an engagement portion on the frame structure, and the frame structure can be reduced in size and weight.

In an embodiment of the present invention, in regard to this vehicle seat, each hook provided at the end part of the skin member is configured to be engaged by the edge of the engagement hole so that the end part of the skin member can be secured to the support member by using a simple structure.

In an embodiment of the present invention, in regard to this vehicle seat, the hook is engaged to the edge wall provided at the edge of the engagement hole so that the hook can be prevented from inadvertently dislodged from the engagement hole.

In an embodiment of the present invention, in regard to this vehicle seat, the support member includes a main body provided with an engagement hole and an inclined portion provided laterally outward of the engagement hole so that the deformation of the engagement hole can be prevented and the hook is prevented from being inadvertently dislodged from the engagement hole. The fact that the engagement hole is laterally aligned with the inclined portion contributes to the downsizing of the support member.

In an embodiment of the present invention, in regard to this vehicle seat, the rigidity of the engagement hole is improved by forming a mounting hole reinforced by a rib on a lateral extension line of the engagement hole.

In an embodiment of the present invention, in regard to this vehicle seat, the support member is formed of a resin having a metal wire insert molded therein so that the rigidity of the support member is improved by the wire.

In an embodiment of the present invention, in regard to this vehicle seat, the central longitudinal wire longitudinally crosses the interior of the engagement hole to increase the rigidity of the support member around the engagement hole, and since the wire is received in the slot of the hook, the hook can be hooked on the edge of the engagement hole in a secure manner.

In an embodiment of the present invention, in regard to this vehicle seat, the wire includes a side longitudinal wire, and this further contributes to the reduction in the size of the supporting member.

In an embodiment of the present invention, in regard to this vehicle seat, since the central lateral wire extends along the lengthwise direction of the engagement hole, the reinforcing action of the wire is enhanced.

In an embodiment of the present invention, in regard to this vehicle seat, the engagement portion is displaced from a position at which the skin member is pulled down at a rear part of the seat cushion so that the efficiency in the assembling work can be improved.

BRIEF DESCRIPTION OF THE DRAWINGS

FIG. 3 is a sectional view of an inclined portion and a cover member taken along a plane passing through a tubular portion as viewed from behind (with the pad omitted from illustration);

FIG. 4 is an enlarged plan view of a side part of a support member and a side member;

FIG. 6 is an enlarged perspective view of the inclined portion in the present embodiment (with the cover member omitted from illustration);

FIG. 7 is a rear view of a region surrounding the inclined portion in the present embodiment;

FIG. 11 is a bottom view of the inclined portion of another modified embodiment.

DETAILED DESCRIPTION OF THE PREFERRED EMBODIMENT(S)

A preferred embodiment of the present invention is described in the following with reference to the appended drawings. The fore and aft, lateral and vertical directions as mentioned in the following description are based on the fore and aft, lateral and vertical directions of the vehicle.

Figure 1:
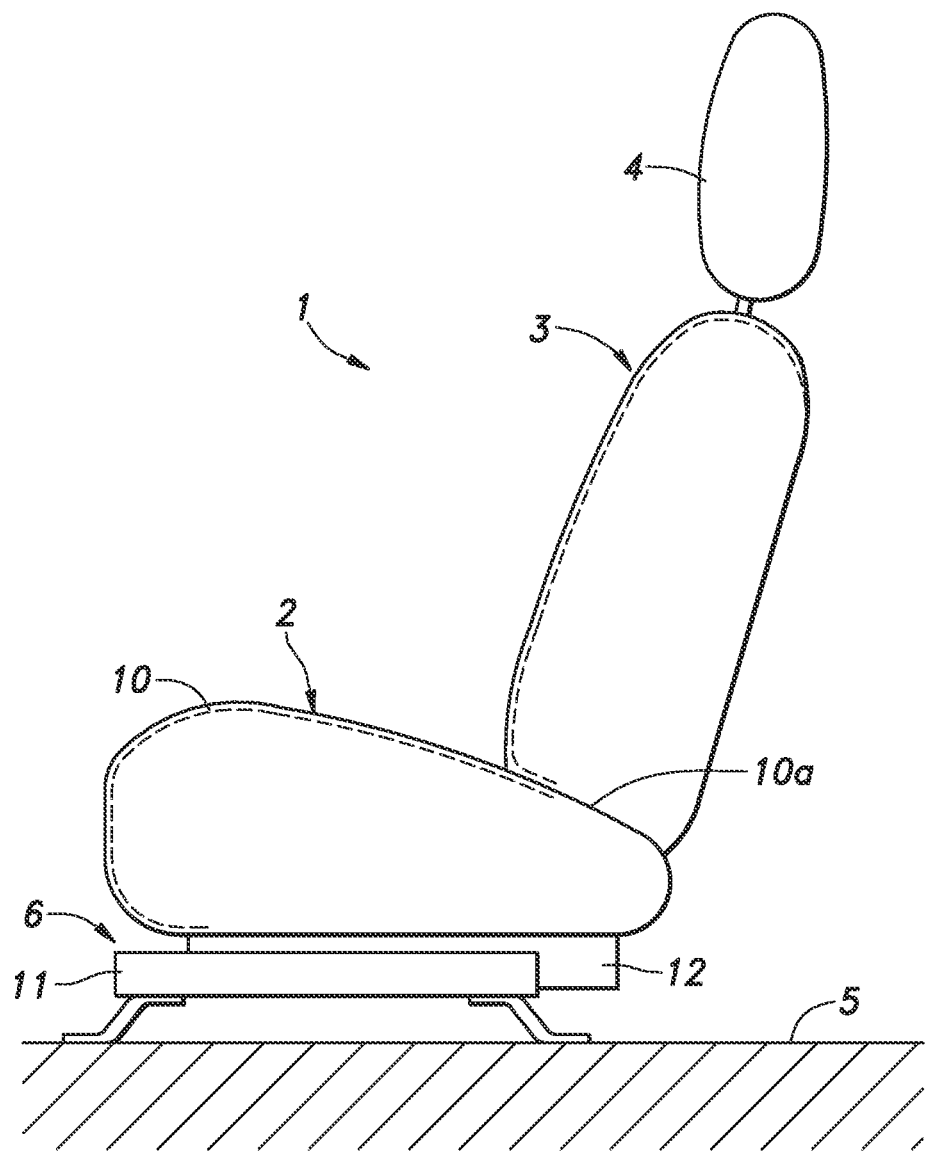
FIG. 1 is a side view of a seat according to an embodiment of the present invention.

As shown in FIG. 1, the seat 1 is configured to be used as a driver's seat or a passenger seat of a vehicle, and includes a seat cushion 2, a seat back 3, and a headrest 4. The seat cushion 2 is supported by a left and a right slide rail 6 fixed to a floor 5 of the cabin so as to be slidable in the fore and aft direction. The seat 1 also has a deformable pad 9 made of urethane foam or the like placed on the seat frame structure 7 and a support member 8 (see FIG. 2), and a skin member 10 covering the pad 9. Each slide rail 6 includes a lower rail 11 connected to the floor 5, an upper rail 12 supported by the lower rail 11 so as to be slidable in the fore and aft direction, and a rail cover 13 (see FIG. 3) that covers at least a part of the upper rail 12.

Figure 2:
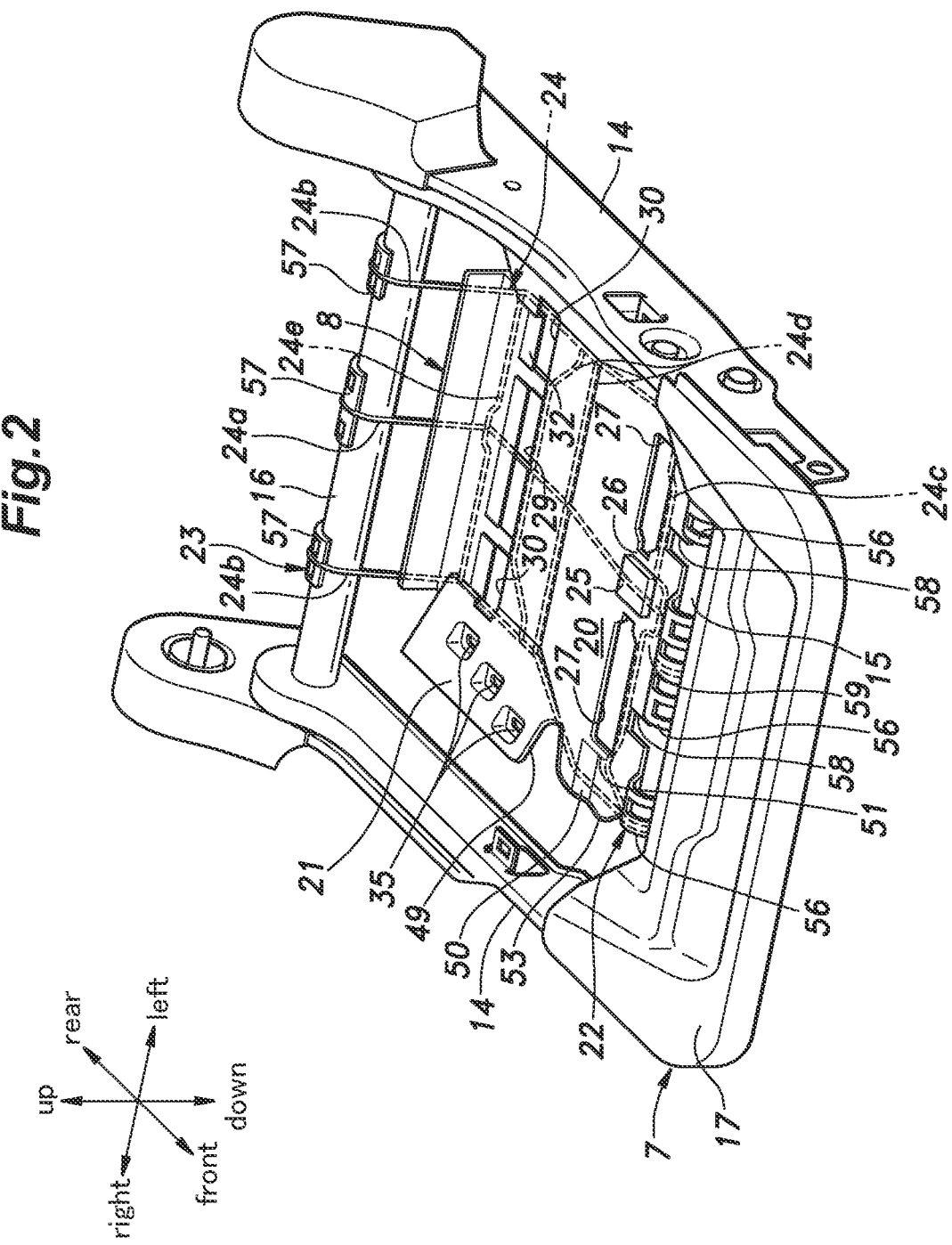
FIG. 2 is a perspective view of a seat frame structure and a support member of the seat of the present embodiment.

As shown in FIG. 2, the seat cushion 2 is formed by the seat frame structure 7 having a frame structure, and the support member 8 which is supported by the seat frame structure 7 so as to be positioned inside the seat frame structure 7 to elastically support the load of the occupant of the seat 1 via the skin member 10 and the pad 9 (see FIG. 1).

The seat frame structure 7 includes a left and a right side member 14, a front cross member 15 connecting the front end portions of the side members 14 to each other, a rear cross member 16 connecting the rear end portions of the side members 14 to each other, and a pan frame 17 connected to the front end portions of the side members 14 and having a laterally intermediate part located in front of the front cross member 15. The side members 14 each consist of a metal sheet member elongated in the fore and aft direction and having flanges at the upper and lower ends thereof. Each side member 14 is supported by the corresponding upper rail 12 via a base member 65 (see FIG. 3). The front cross member 15 and the rear cross member 16 each consist of a metal pipe member extending in the lateral direction. The pan frame 17 is made of sheet metal and has a surface generally defining a front part of the seat surface. As shown in FIG. 4, the right side member 14 is provided with a position sensor 19 for detecting the fore and aft position of the seat 1 with respect to the floor 5.

As shown in FIG. 2, the support member 8 is supported by the seat frame structure 7 so as to be positioned inside the seat frame 7. The support member 8 includes a plate-shaped main body 20 that extends substantially parallel to the seat frame 7, a pair of inclined portions 21 that extend laterally outward from either side edge of a rear part of the main body 20 with an upward slant toward the lateral outer edges thereof, a front mounting portion 22 that extends forward from the front edge of the main body 20 to be engaged by the front cross member 15, and a rear mounting portion 23 that extends rearward and obliquely upward from the rear edge of the main body 20 to be engaged by the rear cross member 16. The main body 20 may be inclined in such a manner that a rear part of the main body 20 includes an inclined part inclining upward as one moves forward in a part thereof in front a longitudinally middle part thereof. The support member 8 is formed of a resin having metal wires 24 insert molded therein so as to flex under the load of the occupant and elastically support the occupant.

A sensor mounting portion 26 for mounting a pressure sensor 25 thereon is formed on the upper side (proximal side) of a laterally central part of the front part 50 of the main body 20. The pressure sensor 25 detects the pressure applied to the seat cushion 2 in order to determine if an occupant is seated on the seat 1 or not. The pressure applied to the rear part of the main body 20 under the load of the occupant is comparatively small since the load of the occupant is spread widely by the inclined portions 21. Therefore, the pressure sensor 25 is positioned so as to be offset forward with respect to the inclined portions 21 so as not to be affected by the pressure spreading action of the inclined portions 21. Thus, the accuracy of the seating determination by the seating determination means (not shown in the drawings) such as an ECU that receives the signal from the pressure sensor 25 is improved.

The seat 1 (see FIG. 1) is provided with an air ventilation system that either draws or blows air into or out of the surface of the seat 1 to control the humidity. A pair of air openings 27 are passed vertically through the main body 20 on either side of the sensor mounting portion 26 so as to serve as air passages. Each air opening 27 has a rectangular shape in plan view. A central longitudinal wire 24a for reinforcement extending in the longitudinal direction is embedded in the resin part that is interposed between the air openings 27 to form the sensor mounting portion 26.

Further, the rear part of the main body 20 is provided with a laterally centrally located central engagement hole 29, and a pair of side engagement holes 30 which are located on either side of the central engagement hole 29, these engagement holes being through holes for engaging a plurality of hooks 28 (see FIG. 5) attached to the end part of the skin member 10 and for adjusting the bending property of the support member 8. The central engagement hole 29 and the side engagement holes 30 each have a rectangular shape in plan view. The central engagement hole 29 and the side engagement holes 30 are thus arranged laterally, and have a same fore and aft dimension, but the central engagement hole 29 is laterally wider than the side engagement holes 30. Therefore, the laterally central part of the support member 8 has a comparatively high flexibility so as to provide a softer seating feeling. By thus differentiating the lateral widths of the central engagement hole 29 and the side engagement holes 30, the flexibility of the support member 8 can be controlled so as to improve the seating comfort. Owing to the presence of the central longitudinal wire 24a extending longitudinally and laterally centrally across the central engagement hole 29, the material strength of the main body 20 around the central engagement hole 29 can be increased. As shown in FIG. 5A, the hook 28 that is locked onto the central engagement hole 29 is provided with a slot 31 that receives the central longitudinal wire 24a therein so that the hook 28 can be particularly firmly engaged by the central engagement hole 29. The hook 28 locked onto the central engagement hole 29 is thus provided with a different shape from those locked onto the side engagement holes 30, and has a larger width. By varying the shapes and the sizes of the hooks 28 depending on the shapes and the sizes of the engagement holes to be locked onto in this manner, the worker is prevented from assembling the hooks 28 onto the wrong engagement holes. Since the central engagement hole 29 and the side engagement holes 30 are spaced from the rear mounting portion 23, assembling efficiency is improved. Since the skin member 10 can be locked to the support member 8 itself, the need to provide projecting pieces or the like to serve as engagement portions on the seat frame structure 7 can be eliminated, and the seat frame structure 7 can be made smaller and lighter.

Figure 5C:
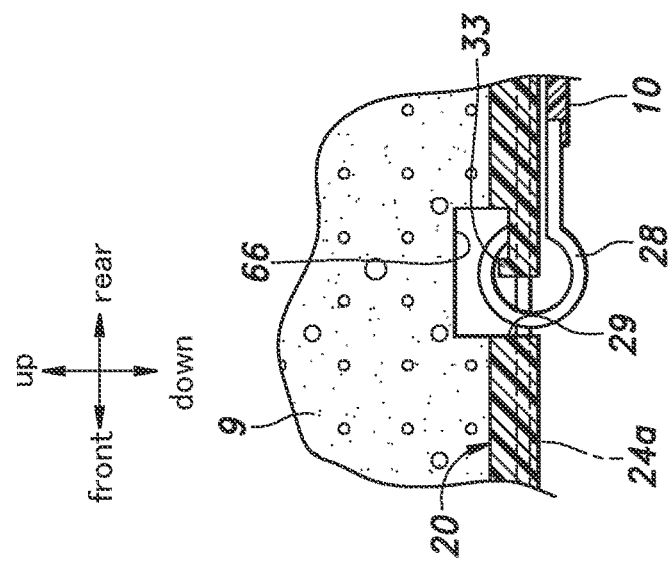
FIG. 5 is drawings showing the mode of engagement between the skin member and the support member in the present embodiment (A: plan view, B: sectional view, C: sectional view of a modified embodiment)

As shown in FIGS. 2 and 5, the upper side (proximal side) of the part of the main body 20 defining the rear edge of each of the central engagement hole 29 and the side engagement holes 30 is provided with a hook recess 32 which is recessed toward the lower side (distal side). The hook 28 is passed through each engagement hole from the lower side to the upper side until the tip of the hook 28 is received by the corresponding hook recess 32. By receiving the tip of the hook 28 in the hook recess 32, the hook 28 can be correctly positioned with respect to the corresponding engagement hole. It is also possible to provide, instead of the hook recess 32, a hook edge wall 33 projecting in the upper direction (proximal direction) from the upper side (proximal) of the part of the main body 20 defining the rear edge of the central engagement hole 29 to engage the tip of the hook 28 as shown in FIG. 5C. The same applies to the side engagement holes 30. By engaging the tip of the hook 28 with the hook edge wall 33, the hook 28 is prevented from being inadvertently dislodged from the central engagement hole 29 or the side engagement hole 30. Further, since the central engagement hole 29 and the side engagement holes 30 are provided in the parts of the main body 20 aligning with the left and right inclined portions 21 in side view, or in other words located at positions where the rigidity is relatively high, deformation of the side engagement holes 29 and the side engagement holes 30 can be minimized with the result that the hooks 28 are effectively prevented from being inadvertently dislodged from the central engagement holes 29 and the side engagement holes 30.

As shown in FIGS. 2, 3, and 6 to 8, each inclined portion 21 is formed with tubular portions 34 that project downward (in the distal direction orthogonal to the main body 20). Each tubular portion 34 internally defines a mounting hole 35 that allows a clip 37 for mounting another member to the support member 8 to be passed therethrough. The inner peripheral surface of each tubular portion 34 is formed with a shoulder surface 38 for increasing the rigidity of the tubular portion 34 and for locking the tip of the clip 37. For example, the tubular portion 34 includes a bottom wall 34a having a through hole for receiving the clip 37, and having a rectangular shape in plan view, and a side wall 34b standing upright from the outer periphery of the bottom wall 34a. The upper surface of the bottom wall 34a thus forms the shoulder surface 38. Since the lower end of the tubular portion 34 is located substantially on the same plane as the distal surface of the main body 20 and the mounting hole 35 extends orthogonally to the main body 20, the clip 37 can be attached to the inclined portion 21 from the distal (back) surface side in a similar manner as in the assembly work for the main body 20. More specifically, the work efficiency in attaching the clip 37 to the tubular portion 34 is improved as compared with the case where the clip is attached to the inclined portion 21 in an oblique direction. Further, owing to the shoulder surface 38, the tip of the clip 37 is prevented from protruding from the surface 38 of the inclined portion 21 so that the clip 37 is prevented from adversely affecting the seating comfort. The positions of the central engagement hole 29 and the side engagement holes 30 are offset from the pull-down positions 10a of the skin member 10 provided in the pad 9. Further, when the skin member 10 is to be fixed to the side member 14 as well, the corresponding fixing position of the side member 14 may be displaced from the inclined portion 21 in the fore and aft direction.

The lower surface of each inclined portion 21 is provided with a lattice-like reinforcing portion 39. The lattice-like reinforcing portion 39 includes a plurality of longitudinal ribs 40 projecting downward and extending in the fore and aft direction, and a plurality of lateral ribs 41 projecting downward and extending laterally along the inclined portion 21. Since the rigidity of the inclined portions 21 is improved by the lattice-like reinforcing portions 39, the deformation of the inclined portions 21 can be minimized, and the position of the support member 8 with respect to the seat frame structure 7 can be stabilized. The tubular portions 34 are positioned in the respective lattice-like reinforcing portions 39, and part of the longitudinal ribs 40 and/or lateral ribs 41 are preferably connected to the tubular portions 34 to make up for the reduction in rigidity due to the provision of the mounting holes 35. The lower edges of the part of the lateral ribs 41 located laterally inward of each tubular portion 34 and connected to the tubular portion 34 are positioned at the same height as the lower end of the tubular portion 34 or lower than the lower end of the tubular portion 34. This part of the lateral ribs 41 improves the rigidity of the entire length of the tubular portion 34. Further, this part of the lateral ribs 41 may have rib wires 24f embedded therein. The rib wires 24f are preferably located at the same height as the lower end of the tubular portion 34 or below the lower end of the tubular portion 34. Since the tubular portions 34 reinforced by the longitudinal ribs 40 and the lateral ribs 41 are provided laterally next to the central engagement hole 29 and the side engagement holes 30, the rigidity of the parts of the main body 20 surrounding the central engagement hole 29 and the side engagement holes 30 is increased.

Further, as in the modified embodiment shown in FIG. 11, in order to increase the rigidity of the inclined portions 21, the annular hole wire 24g may be placed around the tubular portion 34. In this case, the wire 24 is preferably arranged so as to intersect the longitudinal ribs 40 and the lateral ribs 41.

As shown in FIG. 4, the part of each side edge of the support member 8 located between the main body 20 and the corresponding inclined portion 21 provided behind thereof is formed with a side cut-out 49. The position sensor 19 is attached to the side member 14 so as to be within the fore and aft range of the side cut-out 49. The presence of the side cut-out 49 reduces the size and weight of the support member 8, and also allows the mounting state of the position sensor 19 to be easily checked. The side cut-out 49 may be provided only on the side edge of the support member 8 on which the position sensor 19 is provided. Except that the position sensor 19 is provided only on one side of the seat frame 7. the overall structure of the seat frame structure 7 and the support member 8 is substantially mirror symmetrical with respect to a central plane orthogonal to the lateral direction.

Since no inclined portion 21 is provided in front of the side cut-outs 49, the side edges of the main body 20 define the side edges of the support member 8 in the front part 50 of the support member 8. The fore and aft length of the front part 50 is shorter than the fore and aft length of the inclined portions 21, and the laterally outer edges of the front part 50 are located inward of the corresponding laterally outer edges of the inclined portions 21. Therefore, the load applied to the front part is reduced, and the load applied to the rear part is distributed laterally, with the result that that the strength requirement of the support member 8 is improved as a whole. Further, each lateral side edge part of the front part 50 of the main body 20 is given a crank shape 50a so as to be lower in the front than in the rear in side view so that the rigidity reduced by the side cut-outs 49 is compensated. Since the front of the crank shape 50a is lower than the rear, the load on the legs of the occupant is reduced. Further, when another member is attached to the back side of the lowered portion of the crank shape 50a, the influence of the tip of the clip (not shown in the drawings) protruding from the upper side is mitigated by the raised portion of the crank shape 50a so that the seating comfort is prevented from being impaired. Further, even though the front side is lowered, since the occupant's buttocks are supported primarily by the rear side, the crank shape 50a is prevented from adversely affecting the performance of the support member 8 to support the buttocks of the occupant, and the reduction in the seating comfort can be avoided. In addition, the parts of the main body 20 adjoining the air openings 27 from laterally outer side thereof are connected to the parts of the front part 50 of the main body 20 which are lowered due to the provision of the crank shapes 50a via bent portions 51 which present a bent shape in front view. The bent portions 51 extend from the vicinity of the respective air openings 27 to the vicinity of the front edge of the main body 20. The bent portions 51 compensate for the reduction in rigidity owing to the provision of the air openings 27. The crank shapes 50a, the bent portions 51, and the front wall portions 50b extending laterally outward from the front ends of the respective bent portions 51 define a pair of recesses 50c on the front sides of the left and right side portions of the front part 50. Since the recesses 50c increase the rigidity of the parts of the support member 8 surrounding the recesses 50c, the mounting stability of the parts of the front mounting portion 22 positioned on the left and right sides of the support member 8 to the front cross member 15 is improved. Ribs 50d extending in the fore and aft direction and the lateral direction may be provided on the proximal surface of the recesses 50c.

As shown in FIGS. 3 and 4, in order to increase the rigidity of the side edges of the support member 8, flanges 53 projecting to the upper side are provided on the side edges of the front part 50 of the main body 20, and flanges 54 projecting to the lower side are provided on the side edges of the inclined portions 21. The flanges 53 are continuous at least over the fore and aft range along which the bent portions 51 extend. To increase the rigidity, the rear ends of the flanges 53 may extend to the parts of the inclined portions 21 where the side cut-outs 49 are formed. When a clip (not shown in the drawings) is attached to a hole 55 provided near the front side edge part of the main body 20, the tip of the clip projects to the upper side of the main body 20. The flanges 53 projecting to the upper side mitigate the influence of the projection tip of the clip on the seating comfort. Meanwhile, the tip of the clip 37 attached to the mounting hole 35 does not project to the upper side of the inclined portion 21 since the mounting hole 35 of each inclined portion 21 is provided with the shoulder surface 38. Thus, the flange 54 of each inclined portion 21 projects to the lower side so as not to adversely affect the seating comfort.

As shown in FIG. 2, the wires 24 embedded in the resin forming the support member 8 include those extending in the lateral direction to increase the rigidity of the surrounding parts of the support member 8. The front lateral wire 24c is positioned in front of the left and right air openings 27 substantially along the front edge of the main body 20, and the central lateral wire 24d is positioned between the air openings 27, and the central engagement hole 29 and the side engagement holes 30. The rear lateral wire 24e is positioned behind the central engagement hole 29 and the left and right side engagement holes 30 substantially along the rear edge of the main body 20. A part of the central lateral wire 24d is positioned along the front edges of the central engagement hole 29 and the side engagement holes 30.

The front mounting portion 22 is engaged with the front cross member 15 from above, and is provided with three front mounting pieces 56 which are separated from each other for easy mounting. Similarly, the rear mounting portion 23 is provided with three rear mounting pieces 57 that are engaged with the rear cross member 16 from above, and are separated from each other for easy mounting. The central longitudinal wire 24a and the side longitudinal wires 24b are embedded in the corresponding front mounting pieces 56 and rear mounting pieces 57 at the two ends thereof, respectively, so as to reinforce the front mounting portion 22 and the rear mounting portion 23.

A pair of front notches 58 are provided in the parts of the front edge of the main body 20 which are not connected to the front mounting pieces 56. The lateral width of each front notch 58 is smaller than the distance between the two adjacent front mounting pieces 56 connected to the front edge of the main body 20. Therefore, the contour of the space defined by the front edge of the main body 20 and the two adjoining front mounting pieces 56 has a shape of letter T in plan view. By providing the front notches 58, the part of the main body 20 ranging from the vicinity of the front edge of the main body 20 to the front mounting pieces 56 can be made substantially deformable so that the assembling of the front mounting pieces 56 to the front cross member 15 can be facilitated. Further, since the width of each front notch 58 is smaller than the distance between the two front mounting pieces 56 adjacent to each other, the impairment of seating comfort due to the presence of the front notches 58 can be prevented. Further, between the sensor mounting portion 26 and the central front mounting piece 56 is provided a connecting portion 59 having the central longitudinal wire 24a embedded therein. Therefore, the laterally central region of the front part of the main body 20 which is otherwise reduced in rigidity owing to the presence of the air openings 27 and the front notches 58 is given with an adequate rigidity by the connecting portion 59. The front mounting pieces 56 are each provided with a hook shape extending substantially forward from the main body 20, and the rear mounting pieces 57 are each provided with a hook shape extending obliquely upward and rearward from the rear edge of the main body 20.

The front lateral wire 24c extends along the front edge of the main body 20 and is bent so as to avoid the front notches 58. The left and right ends of the front lateral wire 24c extend laterally outward of the bent portions 51 and are bent forward along the flanges 53, thereby reinforcing the front corners of the main body 20 without enlarging the support member 8.

Preferably, the pad 9 (see FIG. 5) is placed above the front mounting pieces 56 (see FIG. 2) of the support member 8. In this case, since the load of the occupant is applied to the front mounting piece 56 via the pad 9, the engagement strength of the front mounting pieces 56 engaged with the front cross member 15 (see FIG. 2) from above is increased.

Figure 5B:
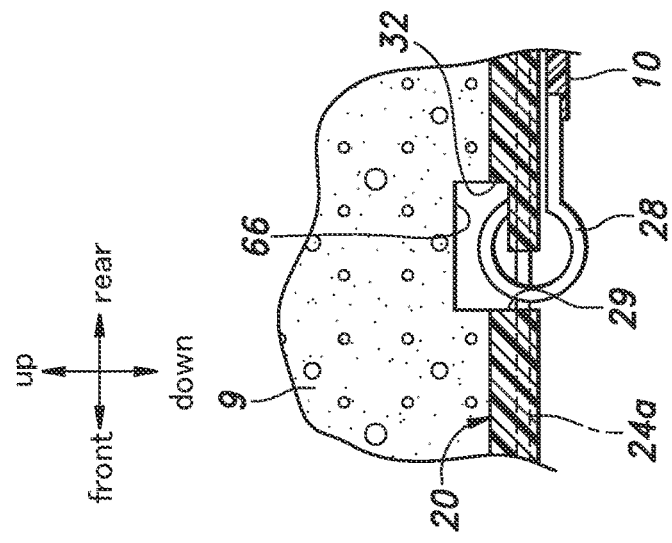
Figure 5A:
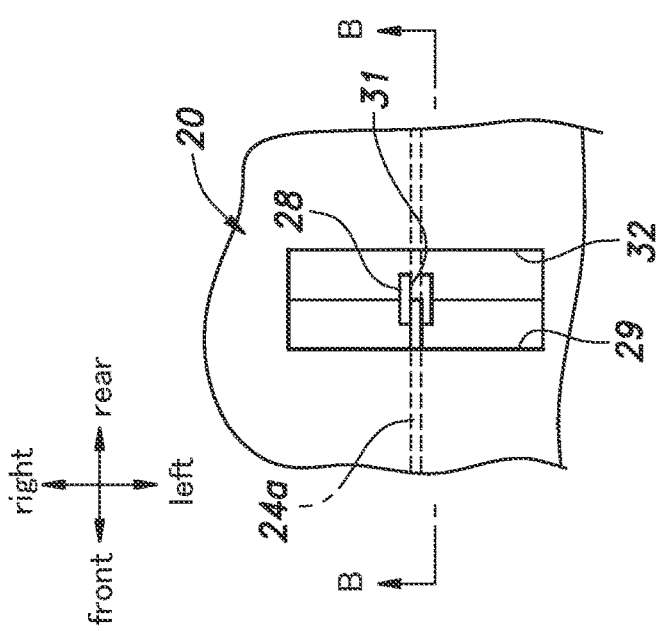
Figure 8:
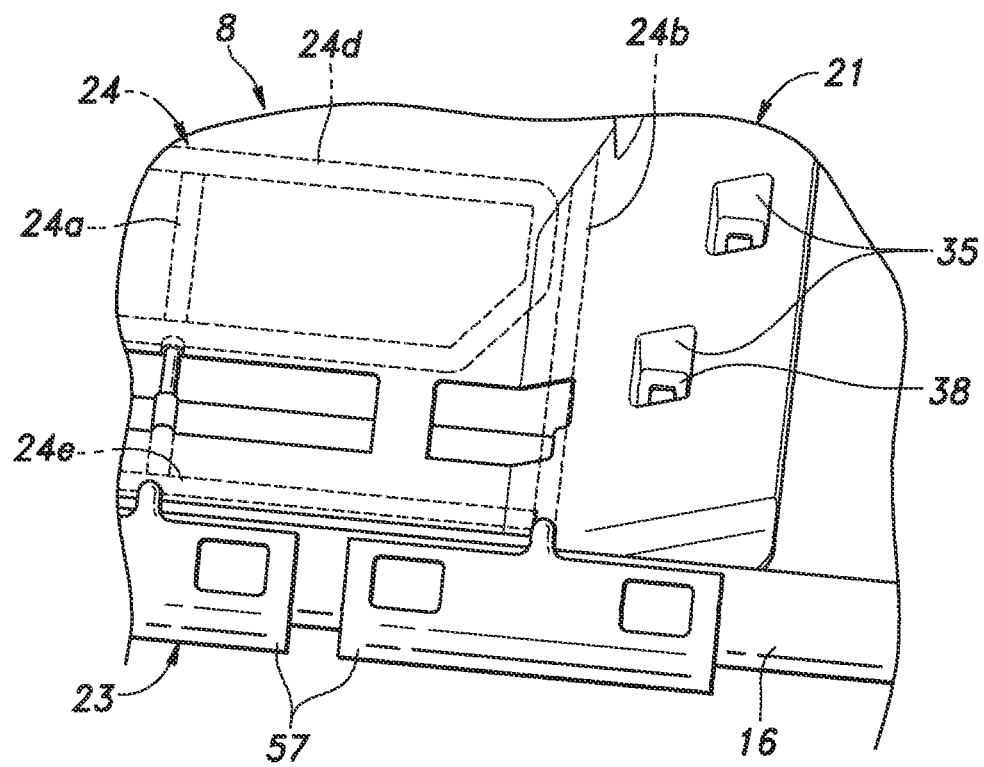
FIG. 8 is a perspective view of a right rear region of the seat frame and the support member in the present embodiment.

As shown in FIGS. 5B and 5C, the part of the pad 9 opposing each hook 28 is formed with a hook receiving portion 66 which is recessed upward. Owing to presence of the hook receiving portions 66, interference between the pad 9 and the hooks 28 can be avoided so that and the assembly work in attaching the hook 28 to the central engagement hole 29 and the side engagement holes 30 can be facilitated. In order to prevent the hooks 28 from being inadvertently dislodged, the parts of the pad 9 opposing the hooks 28 may be configured to be pressed against the hooks 28, instead of being provided with the hook receiving portions 66.

Figure 9:
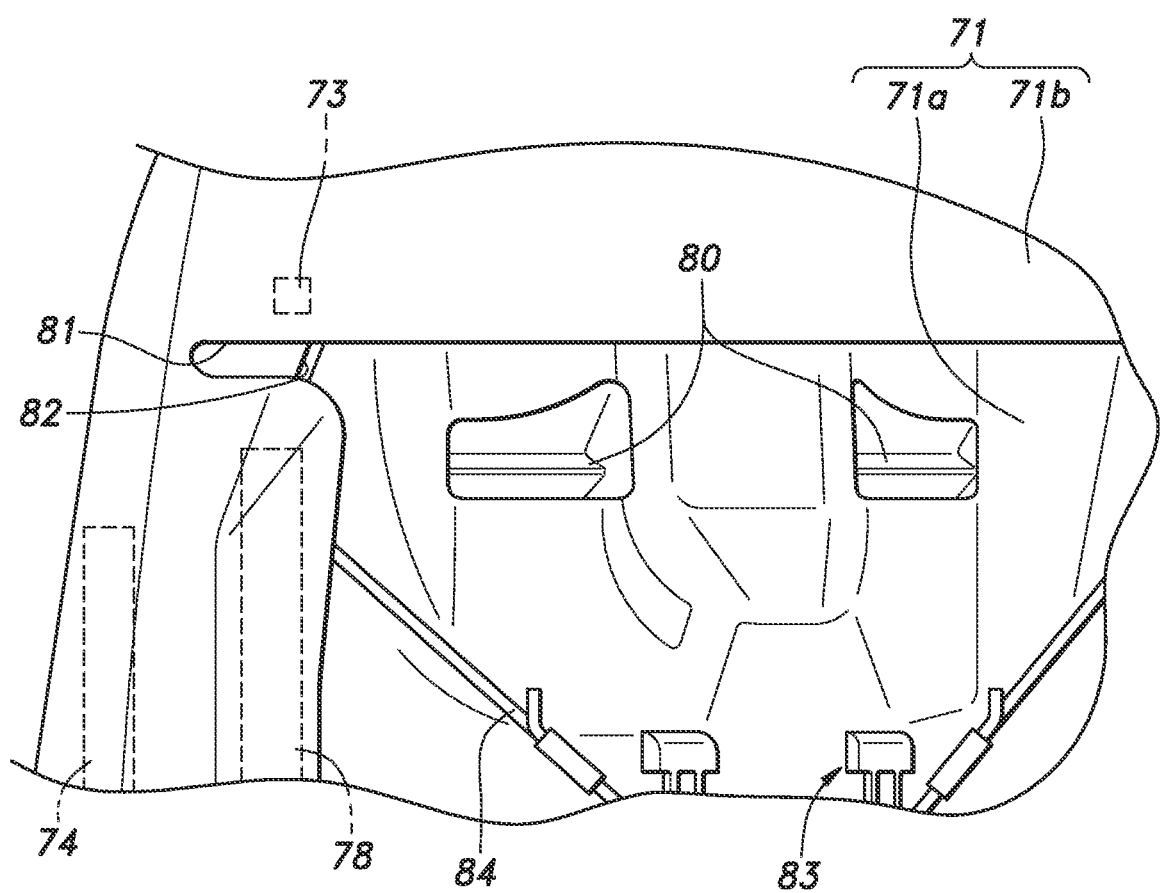
FIG. 9 is a rear view of the pad of the seat back in the present embodiment.
Figure 10:
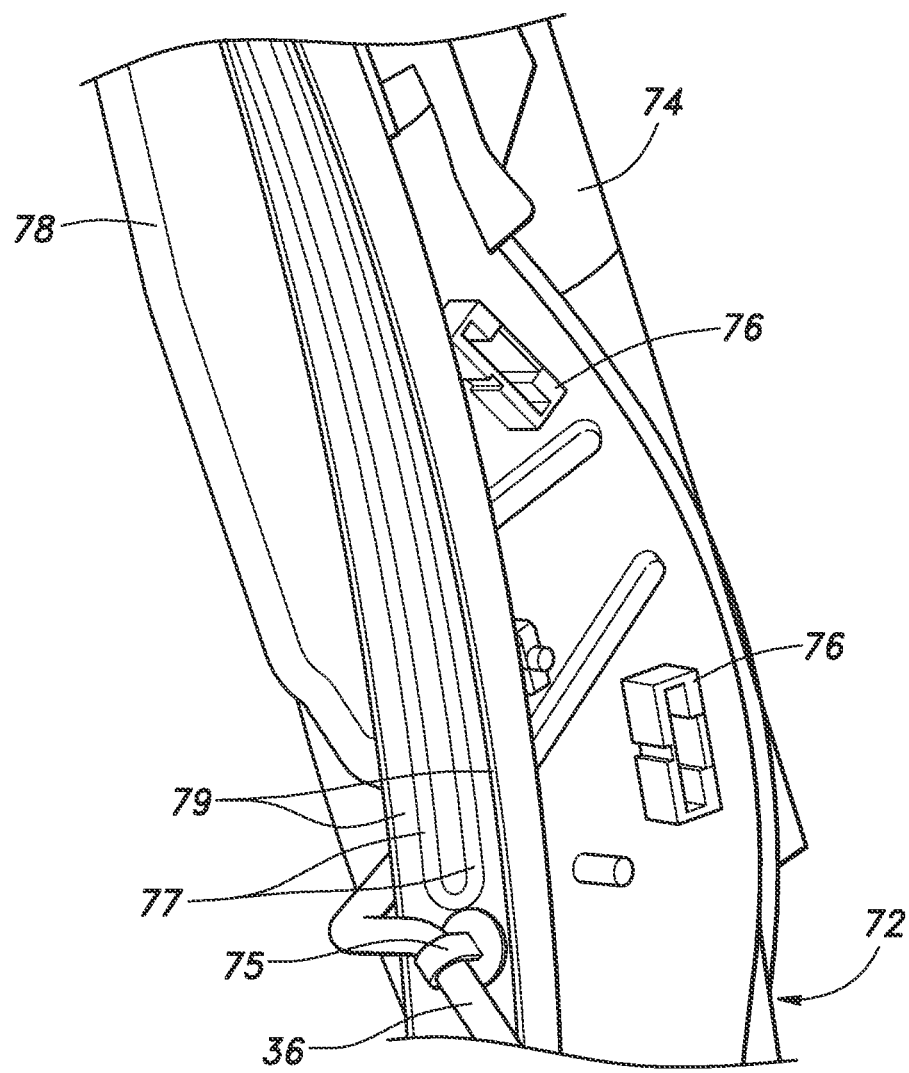
FIG. 10 is a perspective view of the side member of the seat back in the present embodiment as viewed from an inward and front side.

FIG. 9 is a rear view of the pad 71 of the seat back 3 (see FIG. 1), and FIG. 10 is a perspective view of the side member 72 of the seat back 3 as seen from an inner front view point. Of the skin fixing members 73 that are used for fixing the skin member 10 (see FIG. 1), those provided on the upper end side of the skin member 10 fix the skin member 10 preferably at positions above the airbag 74 which is attached to the side member 72, and the mounting position 75 for another member is preferably displaced vertically, laterally or in the fore and aft direction from the stay cloth clip mounting position 76 of the airbag 74 for an improved work efficiency. When the other member is positioned on the side member 72, the pad 71 is preferably interposed between the other member and the skin fixing members 73 so that the skin fixing members 73 are prevented from being inadvertently dislodged. Further, it is preferable that the other member is attached to a part of the side member 72 adjacent to an area thereof where the rigidity is increased by forming shallow unevenness in the plate-like main body of the side member 72 for an increased rigidity. Further, in the case where a bracket (not shown in the drawings) for supporting the other member is provided on the side member 72, in order to prevent the other member from being inadvertently dislodged and to achieve a compact design, the bracket is preferably provided at an angle so as to avoid the cross member (not shown in the drawings). In order to improve the rigidity, the skin fixing members 73 are preferably provided at positions where the side member 72 and the lower frame (not shown in the drawings) overlap each other or at positions where the side member 72 and the lower frame are welded to each other. When fixing the other member to the side member 72, in order to improve rigidity, the mounting position 75 of the other member is preferably located near the bead 77 facing the airbag 74 and so as to avoid the module holder 78 particularly as seen from the front. Further, in order to improve the rigidity, the mounting position of the airbag 74 is preferably on an extension line of the bead 77. Further, in order to improve assembly work efficiency, it is preferable that the mounting position of the module holder 78 avoids the flange 79 of the side member 72 in side view.

The pad 71 includes a main part 71a placed on the front side and an end part 71b placed on the back side so as to overlap with an upper region and the laterally outer regions of the main part 71a and to be wrapped around the upper frame (not shown in the drawings) and the side member 72 in cooperation with the main part 71a. The main part 71a is provided with pull-down holes 80 for pulling and securing the corresponding parts of the skin member 10 (see FIG. 1). The end part 71b is provided with notches 81 at the junctions between the upper region and the lateral regions thereof so as to extend laterally outward from the inner edges. A through hole 82 is provided in a side region of the main part 71a so as to be on the same plane as the module holder 78 attached to the side member 72. The through hole 82 is located so as to avoid a wire 84 that holds the support member 83.

The present invention has been described in terms of a specific embodiment, but is not limited by such an embodiment, and can be modified in various ways without departing from the scope of the present invention. For instance, the end part of the skin member may be locked by using a structure other than the hooks such as clips. Also, part of the ribs may be omitted so as to increase the deflection of the support member. The foregoing structures of the preferred embodiment and the modified embodiment described above are equally applicable to seat backs, and may also be applied to seats of various vehicles other than road vehicles such as seats for aircraft.

LIST OF REFERENCE NUMERALS

| | |
|---|---|
| 1: seat | 2: seat cushion |
| 7: frame | 8: support member |
| 9: pad | 10: skin member |
| 20: main body | 21: inclined portion |
| 24: wire (24a: central longitudinal wire, 24d: central lateral wire) | |
| 28: hook | |
| 29: central engagement hole (engagement portion) | |
| 30: side engagement hole (engagement portion) | |
| 31: slot | 32: hook recess (recess) |
| 33: hook edge wall (edge wall) | 66: hook receiving portion |

The invention claimed is:

1. A vehicle seat having a seat cushion and a seat back, the vehicle seat comprising:
   a frame structure provided in at least one of the seat cushion and the seat back;
   a support member supported by the frame structure within the frame structure to support an occupant;
   a pad provided on a proximal side of the frame structure and the support member; and
   a skin member covering the pad,
   the support member including a plurality of engagement portions engaging end part of the skin member,
   wherein the support member is formed in a plate shape, the engagement portions each comprise an engagement hole consisting of a through hole formed in the support member, the end part of the skin member being provided with a hook passed through the corresponding engagement hole from a distal side thereof to a proximal side thereof to engage a peripheral edge part of the engagement hole,
   wherein the support member is provided with an inclined portion that extends outward in a lateral direction with respect to the locking portion, the inclined portions is inclined so that a laterally outside edge of the inclined portion is positioned on proximal side with respect to a laterally inside edge of the inclined portion,
   further comprising a clip for fixing another member to the inclined portion, a mounting hole for inserting the clip being formed in a part of the inclined portion located on a lateral extension line of the engagement hole along the supporting member.

2. The vehicle seat according to claim 1, wherein an edge wall projects from the proximal side of the peripheral edge part of each engagement hole to engage a free end of the corresponding hook.

3. A vehicle seat having a seat cushion and a seat back, the vehicle seat comprising:
   a frame structure provided in at least one of the seat cushion and the seat back;
   a support member supported by the frame structure within the frame structure to support an occupant;
   a pad provided on a proximal side of the frame structure and the support member; and
   a skin member covering the pad,
   the support member including a plurality of engagement portions engaging end part of the skin member,
   wherein the support member is formed in a plate shape, the engagement portions each comprise an engagement hole consisting of a through hole formed in the support member, the end part of the skin member being provided with a hook passed through the corresponding engagement hole from a distal side thereof to a proximal side thereof to engage a peripheral edge part of the engagement hole,
   wherein the support member is formed by a resin having a metal wire insert molded therein, and at least a part of the wire extends in a longitudinal direction,
   wherein the wire includes a central longitudinal wire that extends across the engagement hole in the longitudinal direction, and the hook is provided with a slot that receives the central longitudinal wire.

4. The vehicle seat according to claim 3, wherein the wire includes a side longitudinal wire that extends in the longitudinal direction laterally outside of the engagement hole.

5. A vehicle seat having a seat cushion and a seat back, the vehicle seat comprising:
   a frame structure provided in at least one of the seat cushion and the seat back;
   a support member supported by the frame structure within the frame structure to support an occupant;
   a pad provided on a proximal side of the frame structure and the support member; and
   a skin member covering the pad,
   the support member including a plurality of engagement portions engaging end part of the skin member,
   wherein the support member is formed in a plate shape, the engagement portions each comprise an engagement hole consisting of a through hole formed in the support member, the end part of the skin member being provided with a hook passed through the corresponding engagement hole from a distal side thereof to a proximal side thereof to engage a peripheral edge part of the engagement hole,
   wherein the support member is formed by a resin having a metal wire insert molded therein, and at least a part of the wire extends in a longitudinal direction,
   wherein the engagement hole is laterally elongated, and the wire includes a central lateral wire extending laterally adjacent to the engagement hole.

6. The vehicle seat according to claim 1, wherein the engagement portion is displaced from a position at which the skin member is pulled down at a rear part of the seat cushion.

* * * * *